United States Patent [19]

Lee

[11] Patent Number: 5,555,986

[45] Date of Patent: Sep. 17, 1996

[54] ACCOMMODATION CARTRIDGE FOR COMPACT DISCS RACKS

[76] Inventor: Ming Lee, 4th Fl., No. 44, Sec. 1, Mingte Rd., Tucheng City, Taipei Hsien, Taiwan

[21] Appl. No.: 524,519

[22] Filed: Sep. 7, 1995

[51] Int. Cl.$^6$ ..................................................... A47G 29/00
[52] U.S. Cl. .......................... 211/40; 211/194; 206/308.1; 312/9.22
[58] Field of Search ....................... 211/40, 194; D6/407, D6/626, 627, 628, 629, 630; 206/308.1; 312/9.11, 9.16, 9.17, 9.19, 9.21, 9.22

[56] References Cited

U.S. PATENT DOCUMENTS

| | | | |
|---|---|---|---|
| 4,632,248 | 12/1986 | Hsu | 312/9.22 X |
| 4,856,653 | 8/1989 | Ackeret | 312/9.22 X |
| 5,012,922 | 5/1991 | Nehl | D6/627 X |

Primary Examiner—Ramon O. Ramirez
Assistant Examiner—Michael J. Turgeon
Attorney, Agent, or Firm—Jones, Day, Reavis & Pogue

[57] ABSTRACT

An accommodation cartridge for a CD rack includes a base having a U-shaped wall defining an entrance, a plurality of guides extending from a central portion of the base to the wall opposite to the entrance and formed on a bottom of the base, a pin protruding from the bottom of the base near the wall opposite to the entrance, a pliable piece formed near the entrance of the base with a tab protruding from the bottom of the base, a spring mounted onto the pin within the base, and a CD tray having a plate, a wall provided at an end facing the entrance for defining a space for receiving a CD case and an actuating plate for the spring, a corresponding number of teeth extending from an end opposite to the entrance each having a foot protruding from a bottom of the plate for slidably engaging with the guides, an aperture defined in the plate facing the tab for the tab to extend through when the tray is received with the base, and a slot defined in the plate for the tab to extend through and slide within the slot when the tray moves within the base.

4 Claims, 3 Drawing Sheets

5,555,986

ACCOMMODATION CARTRIDGE FOR COMPACT DISCS RACKS

BACKGROUND OF THE INVENTION

The present invention relates to a rack for accommodating optical discs, such as musical compact discs (CD), compact discs (CD-ROM) for computers, etc. More particularly, this invention relates to a CD rack, which permits a user to select a CD.

A conventional CD rack is composed of a plurality of slots arranged in a column or in a row for accommodating a corresponding number of CDs. However, such a conventional rack has a narrow gap between each two slots for the consideration of saving space and the number of the slots is fixed, thus, the user has difficulty in removing the CD from the rack as his/her fingers cannot get into the narrow space and the length of the rack is fixed and cannot be adjusted under substantial requirement.

SUMMARY OF THE INVENTION

An object of the present invention is to provide an accommodation cartridge which permits a user to conveniently access the desired CD through an ejection means.

Another object of the present invention is to provide an accommodation cartridge which can be easily stacked or adjusted to a desired length.

According to the present invention, the accommodation cartridge includes a base, a CD tray received by the base for placing a CD case, and a spring secured within the base for urging the CD tray. The base includes a U-shaped wall defining an entrance, a plurality of guides extending from a central portion of the base to the wall opposite to the entrance and formed on a bottom of the base, a pin protruding from the bottom near the wall for securing the spring, a pliable piece formed near the entrance of the base with a tab protruding from the bottom of the base. The CD tray is composed of a plate, an upright wall protruding from an end facing the entrance for defining a space for receiving a CD case and an actuating plate for the spring, a plurality of feet extending from a bottom of the plate for slidably engaging with the guides, an aperture defined in the plate facing the tab for the tab to extend through when the tray is received within the base, and a slot defined in the plate for the tab to extend through and slide within the slot when the tray moving within the base.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
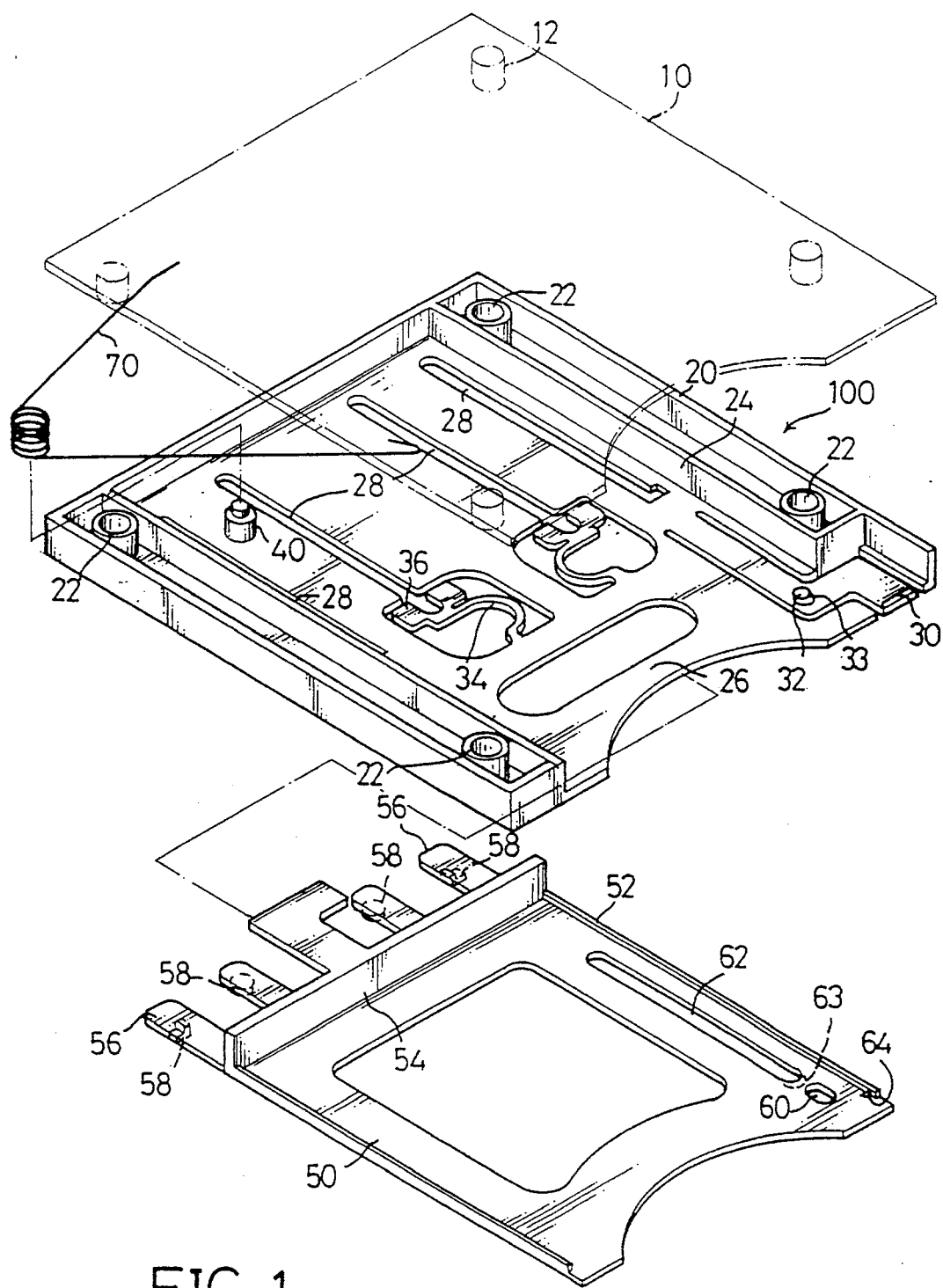
FIG. 1 is a perspective exploded view of an accommodation cartridge for a compact discs rack according to the present invention.

Referring now to drawings wherein like reference characters designate identical or corresponding parts through the several views.

As shown in FIG. 1, an accommodation cartridge 100 for a CD rack includes a cover 10 having four legs 12 (shown in phantom lines), a base 20 having four tubular cavities 22 for coupling with the legs 12 and four legs (not shown) under the base, a CD tray 50 received by the base 20 for placing a CD case (not shown) thereon, and a spring 70 9 secured within the base 20 for urging the CD tray 50. The cover 10 can be replaced by a desired number of cartridges for stacking as a CD rack.

The base 20 includes a U-shaped wall 24 defining an entrance 26, a plurality of guides 28 extending from a central portion of the base 20 to the wall 24 opposite the entrance 26, a pliable piece 30 formed at a corner of the entrance 26 of the base 20 with a tab 32 protruding from the pliable piece 30 for securing the CD tray 50 as will be described later, a plurality of cushioning pieces 34 defined at the central portion of the base 20 each with a fork-shaped head 36 facing a corresponding guide 28, and a pin 40 protruding from the bottom of the base 20 between the guides 28 and near the wall 24 opposite to the entrance 26 for securing the spring 70. The tab 32 has a rising slope surface 33 in the surface facing the entrance 26.

The CD tray 50 includes a plate 52 with an upright wall 54 protruding from an end facing the entrance 26 of the base 20 thereby defining a space for receiving a CD case and an actuating plate for the spring 70, a plurality of teeth 56 extending from the end facing the entrance 26 each having a foot 58 (shown in phantom lines) for slidably engaging with a corresponding guide 28, an aperture 60 defined at a corner of an end opposite to the upright plate 54 for the tab 32 to extend through, and a slot 62 defined from an area near the aperture 60 to a central portion of the plate 50 for slidably receiving the tab 32 when the tray 50 is moving within the base 20. The distal end of the slot 62 adjacent to the aperture 60 has a falling slope surface 63 in cooperation with the slope surface 33 of the tab 32 for the tray 50 to easily engage the tab 32 within the aperture 60 and a ridge 64 is formed at the corner of the tray 50 for engaging with a groove on the CD case.

Figure 2:
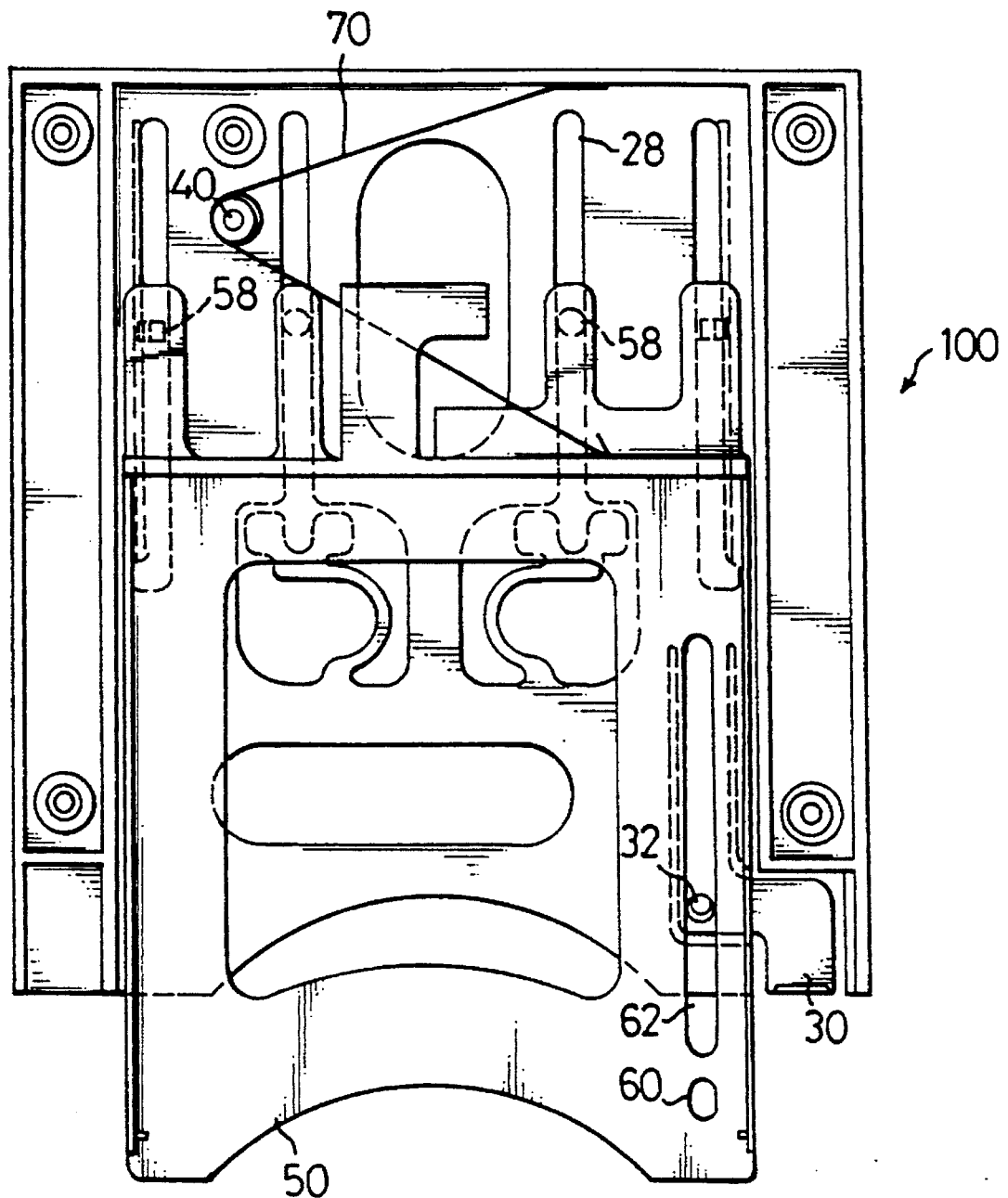
FIG. 2 is a plan view of the accommodation cartridge of FIG. 1.

As shown in FIG. 2, the tray 50 is mounted onto the base 20 by having the feet 58 (in phantom lines) of the tray 50 slidably and respectively engaged with the guide 28, the tab 32 slidably engaged within the slot 62, and the spring 70 secured by the pin 40, thus, a user may place a CD case (not shown) on the tray 50 and push the tray 50 until the tab 32 extends through the aperture 60 as to accommodate the CD case. The user may take the CD case out of the cartridge 100 by pressing down the pliable piece 30 to have the tray 50 pushed by the spring 70.

Figure 3:
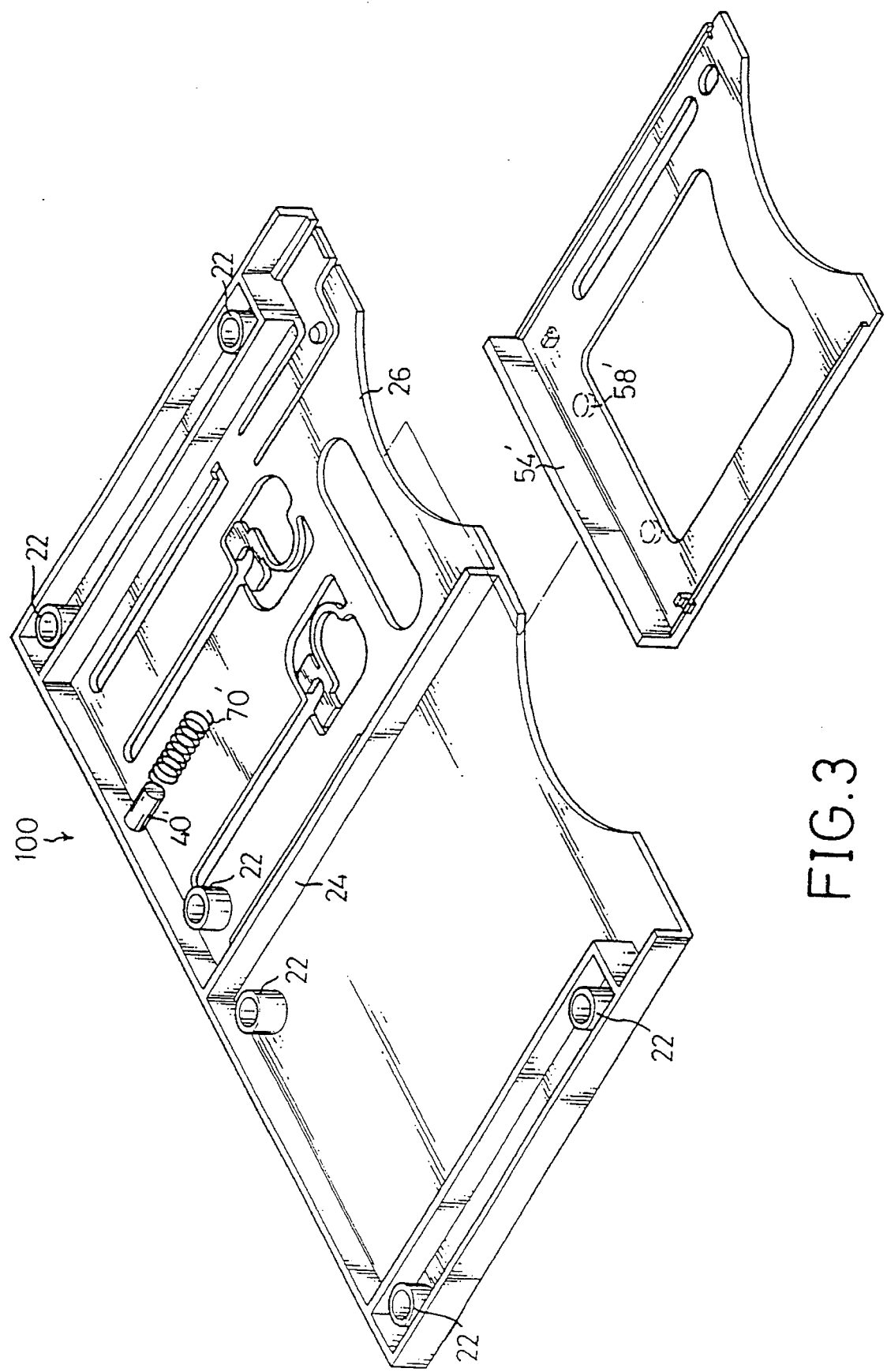
FIG. 3 is a schematic view of another arrangement of two accommodation cartridges of the present invention.

FIG. 3 shows a second embodiment of two accommodation cartridges 100 (only one of the cartridges is detailedly shown) coupled in parallel. As shown, a pin 40' protruding from the wall opposite to the entrance 26 is provided for a spring 70' to mount therearound and the feet 58' are directly formed under the bottom of the base 20 so that the spring 70' can push the wall 54' and the pin 40' can protect the wall 54' from hitting the tubular cavity 22 in the walls 24. This embodiment merely uses six tubular cavities 22 which can save more space and meet a higher economic requirement.

Although the invention has been explained in relation to its preferred embodiment, it is to be understood that many other possible modifications and variations can be made without departing from the spirit and scope of the invention as hereinafter claimed.

What is claimed is:

1. An accommodation cartridge for a CD rack comprising:

a base having a U-shaped wall defining an entrance, a plurality of guides extending from a central portion of the base toward a portion of said U-shaped wall opposite to the entrance and formed on a bottom of the base, a pin protruding from the bottom of the base near the wall opposite to the entrance, a pliable piece formed near the entrance of the base with a tab protruding from the bottom of the base;

a spring mounted onto the pin within the base; and a CD tray having a plate, a wall provided at an end facing the entrance for defining a space for receiving a CD case and an actuating plate for the spring, a corresponding number of teeth extending from an end opposite to the entrance each having a foot protruding from a bottom of the plate for slidably engaging with the guides, an aperture defined in the plate facing the tab for the tab to extend through when the tray is received with the base, and a slot defined in the plate for the tab to extend through and slide within the slot when the tray moves within the base.

2. An accommodation cartridge as claimed in claim 1 further comprising a plurality of cushion pieces provided at the central portion of the base each having a fork-shaped head facing the guides.

3. An accommodation cartridge as claimed in claim 1 wherein said tab has a rising slope surface on a surface facing the entrance and said slot has a falling slope surface in a distal end near the aperture for easily engaging the tab within the aperture.

4. An accommodation cartridge for a CD rack comprising:

a base having a U-shaped wall defining an entrance, a plurality of guides extending from a central portion of the base towards a portion of said U-shaped wall opposite to the entrance and formed on a bottom of the base, a pin provided on the wall opposite to the entrance, a pliable piece formed near the entrance of the base with a tab protruding from the bottom of the base;

a spring mounted onto the pin on the wall opposite to the entrance; and a CD tray having a plate, a bar provided at an end facing the entrance for defining a space for receiving a CD case and an actuating plate for the spring, a corresponding number of feet extending from a bottom of the plate for slidably engaging with the guides, an aperture defined in the plate facing the tab for the tab to extend through when the tray is received with the base, and a slot defined in the plate for the tab to extend through and slide within the slot when the tray moves within the base.

* * * * *